United States Patent [19]

Kinkelaar et al.

[11] Patent Number: 5,549,841
[45] Date of Patent: Aug. 27, 1996

[54] PROCESS FOR MANUFACTURING FOAM WITH IMPROVED WET SET PROPERTIES

[75] Inventors: Mark R. Kinkelaar, Cross Lanes; Keith D. Cavender; James L. Lambach, both of Charleston, all of W. Va.; Robert D. Brasington, Senlis, France; Frank E. Critchfield, South Charleston, W. Va.

[73] Assignee: Arco Chemical Technology, L.P., Greenville, Del.

[21] Appl. No.: 410,439

[22] Filed: Mar. 24, 1995

[51] Int. Cl.⁶ .............................. C09K 3/00; C09G 18/32
[52] U.S. Cl. .................... 252/182.27; 521/129; 521/137; 521/174
[58] Field of Search .................. 252/182.27; 521/129, 521/137, 174

[56] References Cited

U.S. PATENT DOCUMENTS

| | | | |
|---|---|---|---|
| 4,111,865 | 9/1978 | Seefried et al. | 521/137 |
| 5,420,170 | 5/1995 | Lutter et al. | 521/137 |
| 5,478,494 | 12/1995 | Lee et al. | 521/137 |

*Primary Examiner*—Morton Foelak
*Attorney, Agent, or Firm*—Dennis M. Kozak

[57] ABSTRACT

High resilience polyurethane foams having improved wet set properties are obtained by reacting an isocyanate with a polyol component consisting of a polyoxyalkylene polyol with a functionality of 6 or more and a polymer polyol whose base polyol is a polyoxyalkylene polyol with a functionality of 6 or more, both polyols having oxyethylene caps in amounts of from 12 percent to about 30 percent based on the weights of the respective polyols, in the presence of an amine catalyst system. The resulting polyurethane foams are eminently suitable for seating cushions used in tropical or subtropical environments, may be prepared by a cold molding process, and may be used without an elevated temperature post cure.

10 Claims, 1 Drawing Sheet

PROCESS FOR MANUFACTURING FOAM WITH IMPROVED WET SET PROPERTIES

TECHNICAL FIELD

The present invention pertains to polyurethane foams with improved wet set properties. More particularly, the present invention pertains to polyurethane foams having improved wet set properties prepared from a di- or polyisocyante and a blend of polyether polyols and polymer polyols, wherein both polyols have a functionality of six or more, and have an oxyethylene content, present as a cap, of 12% or more by weight of the polyether polyol or base polyol of the polymer polyol.

BACKGROUND ART

Polyurethane high resilience foams are used in large amounts in widely diverse applications. One major commercial area is in the manufacture of seating components, for example furniture and seats and back rests for automobiles and other vehicles. In applications such as the latter, the seat cushions and backs, often containing metallic or polymer inserts for mounting in the vehicle, are molded in closed molds by pouring, spraying, or injecting a measured quantity of reactive, foamable polyurethane forming ingredients into a closed mold, or into an open mold which is subsequently closed. The normally closed cells of such foams are opened in situ, for example by the timed pressure release (TPR) method disclosed in the U.S. Pat. Nos. 4,579,700 and 4,717,518 or are opened by mechanical crushing, for example by hand crushing, roller crushing, and the like.

Molded polyurethane foam may be prepared using hot molding or cold molding techniques. In both methods, heated molds are generally used. In the preparation of hot molded foam, the polyurethane forming ingredients are introduced into the warm (c.a. 65° C.) mold, and the entire mold placed in an oven (c.a. 180° C.) to foam and cure. In cold molded foams, the warm mold is not placed in the oven, but the polyurethane foam simply allowed to cure in the mold. The foam may be demolded after achieving sufficient green strength, and may be post-cured at elevated temperature or by a more extended room temperature post cure.

Due to the problems associated with handling a very hot mold and demolding foam from such a mold, cold molding is preferred over hot molding. Moreover, as any foam post cure takes place outside the mold, the production rate from a given number of molds is increased with cold molding. The products obtained from these processes, however, have different physical properties, and the polyurethane forming ingredients, particularly the catalysts, surfactants, and most importantly, the polyether polyols, are different as between the two methods. Hot molded foam, for example, is generally harder than cold molded foam.

The physical properties of the foams are most important, and are generally set by the manufacturer. In seat cushions, for example, the hardness of the foam is selected to provide a comfortable seat. However, if the compressibility of the foam is too much, the occupant may feel the cushion springs or retainers. Furthermore, the properties of the foam must be maintainable over an extended period of use under varied conditions. Properties such as tensile and tear strength are also important, not only to prevent damage during use, but also to allow cushions to be installed into their frames and covers without damage. Early development of these properties during foam production is also necessary in order to successfully demold the molded foam part.

All foams exhibit some degree of compression set, a permanent or quasi-temporary loss of foam height after being compressed. A portion of the "set" may recover after time, but in general, a small amount of permanent set is introduced during early periods of use. Conditions of high temperature and humidity may aggravate the compression set, as well as other foam properties, due in part to plasticization of the polyurethane polymer by adsorbed water, but also, on occasion, by changes in polymer structure due to hydrolysis, reaction of unreacted isocyanate groups with atmospheric water, and disruption of hydrogen bonding between polar linkages present in the foam polymer.

To evaluate the effects of humidity on foams, the humid aging test (ASTM D2406) has been widely used. In this test, foams are artificially aged by placing the foam specimen in a steam autoclave for 5 hours at 120° C. and 12 to 16 psig steam pressure, followed by drying at 70° C. for 3 hours in a mechanically convected dry air oven. The foams are then allowed to equilibrate for 16 to 24 hours at 23° C. and 50% relative humidity. Physical properties such as 50% compression set and 50% compression load deflection (CLD) loss are then measured. Foams are considered to be of high quality when their humid aged compression set and CLD values compare favorably with those of non-humid aged foam.

Recently, however, it has been found that foams which show satisfactory humid aged physical properties do not perform well in humid hot climates, for example, those characteristics of much of the Pacific Rim, the Mediterranean, and other tropic and subtropic environments. In many such cases, foams which exhibited satisfactory humid aged properties exhibited unsatisfactory loss in many properties, compression set and CLD particularly. Thus, the industry has recently developed more severe tests to evaluate foams.

"Wet Compression Sets" are one class of these more severe tests. Wet sets—like all compression set tests—specify a compression level and time, however, in wet set tests the foam is compressed at elevated temperature and humidity instead of elevated temperature only. One such test method described in K. Saotome et al., "The Improvement of Humidity Resistance in High Resilient Polyurethane Foam", J. CELL PLASTICS, May/June 1977, pp. 203–209, 1977, and in Toyota document BM7100G, Method 4.7.2, termed here as the "Japanese Wet Set", entails a 50% compression of a core sample for 22 hours at 50° C. and 95% relative humidity. Japanese Wet Compression Set is measured after a 30 minute recovery at standard lab conditions (23° C., 50% relative humidity). One other method, proposed by the European automotive manufacturer Renault, entails a 70% compression of a foam sample with skin for 22 hours at 40° C. and 95% relative humidity. Renault Wet Compression Set is measured after a 15 minute recovery at standard lab conditions.

In both these tests, which are hereinafter referred to as "wet compression set" or "wet set," it has been found that foams which appear to have excellent humid aged properties have unsatisfactory wet set. This is particularly the case with cold molded foams, wherein the wet set may often be four times higher than the wet set produced by similar hot mold formulations.

U.S. Pat. No. 4,111,865 discloses foam formulations for high resiliency foams having improved humid aged properties, prepared using both hot molding and free rise techniques, these foams prepared from polyol mixtures containing a variety of 3.2 to 4.8 functional conventional and polymer polyols containing from 3 to 10 weight percent ethylene oxide as a cap, catalyzed by a mixture of tin and amine catalysts. However, the foam formulations disclosed by the '865 patent have a very narrow processing window, and are thus very difficult to manufacture on a commercial scale. Moreover, the humid aged properties appear to peak at ethylene oxide contents in the range of 3 to 5 weight percent, with foams prepared from polyols having a 7% ethylene oxide cap producing foams with increased humid aged compression set and load loss than foams prepared from 3 and 5 weight percent ethylene oxide capped polyols, respectively. The humid aged properties are traditional values, and not "wet set" values. The patentee states that polyols having greater than 10 weight percent oxyethylene caps result in polyurethane foams whose properties deteriorate to an excessive extent during humid aging.

It would be desirable to prepare reactive polyurethane foam formulations suitable for use in the cold molding of high resilience polyurethane foam wherein the resulting foam displays improved wet set properties. It would be further desirable to manufacture molded polyurethane foam articles exhibiting such improved properties.

SUMMARY OF THE INVENTION

It has now been surprisingly discovered that molded polyurethane foams displaying improved wet set characteristics may be prepared by reacting a di- or polyisocyanate with a polyol blend comprising a polyether polyol having a nominal functionality of 6 and a polymer polyol which contains a base polyether polyol with a nominal functionality of about 6, both the polyether polyol and base polyether polyol containing in excess of 12 weight percent oxyethylene moieties as a cap, in the presence of an effective amount of an amine catalyst. Cold molded polyurethane foams prepared by the subject compositions display improved wet sets and are competitive with hot molded foams prepared using tin catalysts without the drawbacks associated with these foams. Moreover, the foam formulations of the subject invention have commercially useful processing windows.

DESCRIPTION OF THE PREFERRED EMBODIMENTS

Figure 1:
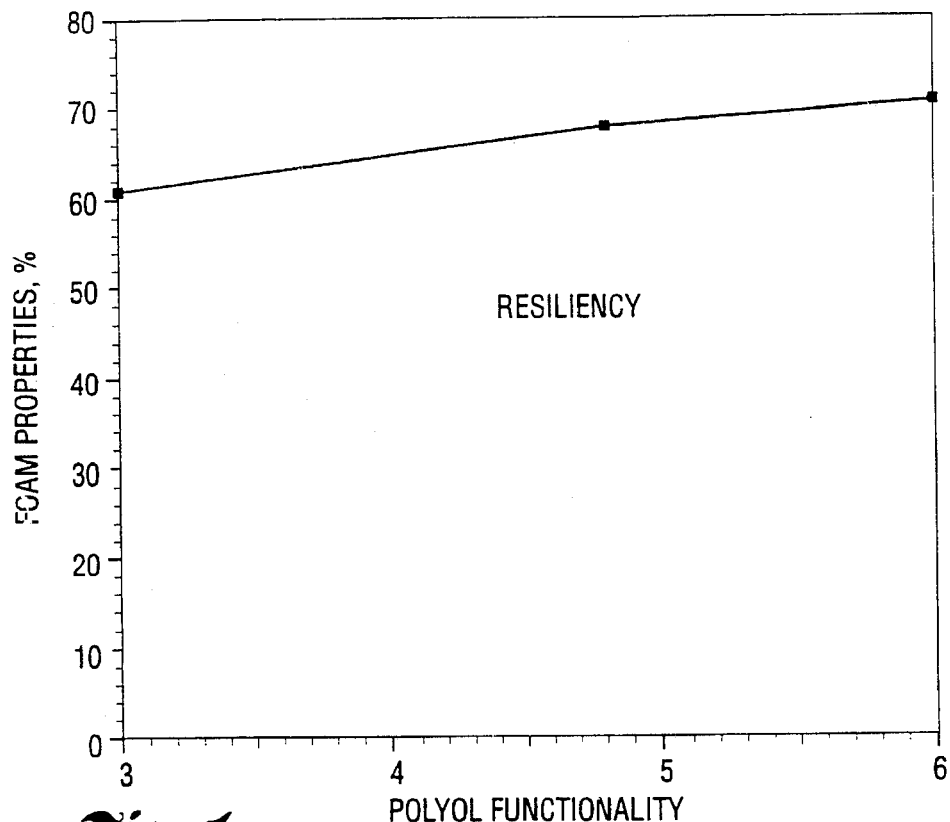
FIG. 1 is a plot of foam resiliency versus polyol functionality for cold molded, amine catalyzed polyurethane foams.

Polyurethane system components are by now well known, and include isocyanates, isocyanate-reactive components (polyols), chain extenders and/or crosslinkers, surfactants, catalysts, and other additives and auxiliaries. The following paragraphs describe these conventional components.

By the term "polyurethane" is meant a polymer whose structure contains predominately urethane

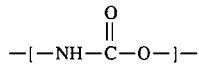

linkages between repeating units. Such linkages are formed by the addition reaction between an organic isocyanate group R—[—NCO] and an organic hydroxyl group [HO—]—R. In order to form a polymer, the organic isocyanate and hydroxyl group-containing compounds must be at least difunctional. However, as modernly understood, the term "polyurethane" is not limited to those polymers containing only urethane linkages, but includes polymers containing allophanate, biuret, carbodiimide, oxazolinyl, isocyanurate, uretidinedione, and urea linkages in addition to urethane. The reactions of isocyanates which lead to these types of linkages are summarized in the POLYURETHANE HANDBOOK, Gunter Oertel, Ed., Hanser Publishers, Munich, ©1985, in Chapter 2, p. 7–41; and in POLYURETHANES: CHEMISTRY AND TECHNOLOGY, J. H. Saunders and K. C. Frisch, Interscience Publishers, New York, 1963, Chapter III, pp. 63–118. In addition to polyols (polyhydroxyl-containing monomers), the most common isocyanate-reactive monomers are amines and alkanolamines. In these cases, reaction of the amino group leads to urea linkages interspersed within the polyurethane structure.

The urethane forming reaction is generally catalyzed. Catalysts useful are well known to those skilled in the art, and many examples may be found for example, in the POLYURETHANE HANDBOOK, Chapter 3, §3.4.1 on pages 90–95; and in POLYURETHANE: CHEMISTRY AND TECHNOLOGY, in Chapter IV, pp. 129–217. Most commonly utilized catalysts are tertiary amines and organotin compounds, particularly dibutyltin diacetate and dibutyltin dilaurate. Combinations of catalysts are often useful also. Tin catalysts are necessary in hot molded foam to avoid foam collapse.

In the preparation of polyurethanes, the isocyanate is reacted with the active hydrogen-containing compound(s) in an isocyanate to active hydrogen ratio of from 0.5 to 1 to 10 to 1. The "index" of the composition is defined as the —NCO/active hydrogen ratio multiplied by 100. While the extremely large range described previously may be utilized, most polyurethane processes have indices of from 70 to about 120 or 130, and more preferably from 95 to about 110. In the case of polyurethanes which also contain significant quantities of isocyanurate groups, indices of greater than 200 and preferably greater than 300 may be used in conjunction with a trimerization catalyst in addition to the usual polyurethane catalysts. In calculating the quantity of active hydrogens present, in general all active hydrogen containing compounds other than non-dissolving solids are taken into account. Thus, the total is inclusive of polyols, chain extenders, functional plasticizers, etc.

Hydroxyl group-containing compounds (polyols) useful in the preparation of polyurethanes are described in the POLYURETHANE HANDBOOK in Chapter 3, §3.1, pages 42–61; and in POLYURETHANES: CHEMISTRY AND TECHNOLOGY in Chapter II, §§III and IV, pages 32–47. Many hydroxyl-group containing compounds may be used, including simple aliphatic glycols, dihydroxy aromatics, particularly the bisphenols, and hydroxyl-terminated polyethers, polyesters, and polyacetals, among others. Extensive lists of suitable polyols may be found in the above references and in many patents, for example in columns 2 and 3 of U.S. Pat. No. 3,652,639; columns 2–6 of U.S. Pat. No. 4,421,872; and columns 4–6 of U.S. Pat. No. 4,310,632; these three patents being hereby incorporated by reference.

Preferably used are hydroxyl-terminated polyoxyalkylene and polyester polyols. The former are generally prepared by well known methods, for example by the base catalyzed addition of an alkylene oxide, preferably ethylene oxide (oxirane), propylene oxide (methyloxirane) or butylene oxide (ethyloxirane) onto an initiator molecule containing on the average two or more active hydrogens. Examples of preferred initiator molecules are dihydric initiators such as ethylene glycol, 1,6-hexanediol, hydroquinone, resorcinol, the bisphenols, aniline and other aromatic monoamines, aliphatic monoamines, and monoesters of glycerine; trihydric initiators such as glycerine, trimethylolpropane, trimethylolethane, N-alkylphenylenediamines, mono-, di-, and trialkanolamines; tetrahydric initiators such as ethylene diamine, propylenediamine, 2,4'-, 2,2', and 4,4'-methylenedianiline, toluenediamine, and pentaerythritol; pentahydric initiators such as diethylenetriamine and α-methylglucoside; and hexahydric and octahydric initiators such as sorbitol and sucrose.

Addition of alkylene oxide to the initiator molecules may take place simultaneously or sequentially when more than one alkylene oxide is used, resulting in block, random, and block-random polyoxyalkylene polyethers. The number of hydroxyl groups will generally be equal to the number of active hydrogens in the initiator molecule. Processes for preparing such polyethers are described both in the POLYURETHANE HANDBOOK and POLYURETHANES: CHEMISTRY AND TECHNOLOGY as well as in many patents, for example U.S. Pat. Nos. 1,922,451; 2,674,619; 1,922,459; 3,190,927; and 3,346,557.

Polyester polyols also represent preferred polyurethane-forming reactants. Such polyesters are well known in the art and are prepared simply by polymerizing polycarboxylic acids or their derivatives, for example their acid chlorides or anhydrides, with a polyol. Numerous polycarboxylic acids are suitable, for example malonic acid, citric acid, succinic acid, glutaric acid, adipic acid, pimelic acid, azelaic acid, sebacic acid, maleic acid, fumaric acid, terephthalic acid, and phthalic acid. Numerous polyols are suitable, for example the various aliphatic glycols, trimethylolpropane and trimethylolethane, α-methylglucoside, and sorbitol. Also suitable are low molecular weight polyoxyalkylene glycols such as polyoxyethylene glycol, polyoxypropylene glycol, and block and random polyoxyethylene-polyoxypropylene glycols. These lists of dicarboxylic acids and polyols are illustrative only, and not limiting. An excess of polyol should be used to ensure hydroxyl termination, although carboxy groups are also reactive with isocyanates. Methods of preparation of such polyester polyols are given in the POLYURETHANE HANDBOOK and in POLYURETHANES: CHEMISTRY AND TECHNOLOGY.

Also suitable as the polyol are polymer modified polyols, in particular vinyl polymer polyols. Vinyl polymer polyol dispersions are well known to the art, and are prepared by the in situ polymerization of one or more vinyl monomers, preferably acrylonitrile and/or styrene, in the presence of a polyether or polyester polyol, particularly polyols containing a minor amount of natural or induced unsaturation. Methods of preparing such polymer polyols may be found in columns 1–5 and in the Examples of U.S. Pat. No. 3,652,639; in columns 1–6 and the Examples of U.S. Pat. No. 3,823,201; particularly in columns 2–8 and the Examples of U.S. Pat. No. 4,690,956; and in U.S. Pat. Nos. 4,524,157; 3,304,273; 3,383,351; 3,523,093; 3,953,393; 3,655,553; and 4,119,586, all of which patents are herein incorporated by reference.

Non-vinyl polymer-containing polymer modified polyols are also useful, for example those prepared by the reaction of a polyisocyanate with an alkanolamine in the presence of a polyol as taught by U.S. Pat. Nos. 4,293,470; 4,296,213; and 4,374,209; dispersions of polyisocyanurates containing pendant urea groups as taught by U.S. Pat. No. 4,386,167; and polyisocyanurate dispersions also containing biuret linkages as taught by U.S. Pat. No. 4,359,541. Other polymer modified polyols may be prepared by the in situ size reduction of polymers until the particle size is less than 20 μm, preferably less than 10 μm.

Also useful in preparing polyurethanes are monomers containing other functional groups which are reactive with isocyanates. Examples of these are preferably the amines, for example the substituted and unsubstituted toluenediamines and methylenedianilines; the alkanolamines; the amino-terminated polyoxyalkylene polyethers; and sulfhydryl terminated polymers, to name but a few. The alkanolamines and amines, particularly diamines, are particularly useful, as the amino group reacts faster than the hydroxyl group and thus these molecules can act as isocyanate chain extenders in situ without the need to prepare prepolymers. Examples of hindered, alkyl substituted aromatic diamines which are particularly useful are disclosed in U.S. Pat. No. 4,218,543.

Many isocyanates are useful in the preparation of urethanes. Examples of such isocyanates may be found in columns 8 and 9 of U.S. Pat. No. 4,690,956, herein incorporated by reference. The isocyanates preferred are the commercial isocyanates toluene diisocyanate (TDI) methylenediphenylene diisocyanate (MDI), and crude or polymeric MDI. Other isocyanates which may be useful include isophorone diisocyanate and dimethylxylylidene diisocyanate. Other isocyanates may be found in the POLYURETHANE HANDBOOK, Chapter 3, §3.2, pages 62–73 and POLYURETHANES: CHEMISTRY AND TECHNOLOGY, Chapter II, §II, pages 17–31.

Modified isocyanates are also useful. Such isocyanates are generally prepared through the reaction of a commercial isocyanate, for example TDI or MDI, with a low molecular weight diol or amine, polyoxyalkylene glycol, alkanolamine, or by the reaction of the isocyanates with themselves. In the former case, isocyanates containing urethane, biuret, or urea linkages are prepared, while in the latter case isocyanates containing allophanate, uretonimine, carbodiimide or isocyanurate linkages are formed.

Chain extenders may also be useful in the preparation of polyurethanes. Chain extenders are generally considered to be low molecular weight polyfunctional compounds or oligomers reactive with the isocyanate group. Aliphatic glycol chain extenders commonly used include ethylene glycol, propylene glycol, 1,4-butanediol, and 1,6-hexanediol. Amine chain extenders include aliphatic monoamines but especially diamines such as ethylenediamine and in particular the aromatic diamines such as the toluenediamines and the alkylsubstituted (hindered) toluenediamines.

Other additives and auxiliaries are commonly used in polyurethanes. These additives include plasticizers, flow control agents, fillers, antioxidants, flame retardants, pigments, dyes, mold release agents, and the like. Many such additives and auxiliary materials are discussed in the POLYURETHANE HANDBOOK in Chapter 3, §3.4, pages 90–109 and in POLYURETHANES: CHEMISTRY AND TECHNOLOGY, Part II, Technology.

Polyurethane foams contain an amount of blowing agent which is inversely proportional to the desired foam density. Blowing agents may be physical (inert) or reactive (chemical) blowing agents. Physical blowing agents are well known to those in the art and include a variety of saturated and unsaturated hydrocarbons having relatively low molecular weights and boiling points. Examples are butane, isobutane, pentane, isopentane, hexane, and heptane. Generally the boiling point is chosen such that the heat of the polyurethane-forming reaction will promote volatilization.

Until recently, the most commonly used physical blowing agents were the halocarbons, particularly the chlorofluorocarbons. Examples are methyl chloride, methylene chloride, trichlorofluoromethane, dichlorodifluoromethane, chlorotrifluoromethane, chlorodifluoromethane, the chlorinated and fluorinated ethanes, and the like. Brominated hydrocarbons may also be useful. Blowing agents are listed in the POLYURETHANE HANDBOOK on page 101. Current research is directed to lowering or eliminating the use of chlorofluorocarbons in polyurethane foams, and following the Montreal Protocol, great strides have been made to reduce or eliminate completely, the use of chlorofluorocarbon (CFC) blowing agents which exhibit high ozone depletion potential (ODP) and global warming potential (GWP). As a result, many new halogenated blowing agents have been offered commercially. A preferred group are, for example, the highly fluorinated alkanes and cycloalkanes (HFCs) and perfluorinated alkanes and cycloalkanes (PFCs).

Chemical blowing agents are generally low molecular weight species which react with isocyanates to generate carbon dioxide. Water is the only practical chemical blowing agent, producing carbon dioxide in a one-to-one mole ratio based on water added to the foam formulation. Unfortunately, completely water-blown foams have not proven successful in some applications such as rigid insulating foam and thus it is still common to use water in conjunction with a physical blowing agent in some cases. Polyurethane high resilience foam is a typical all-water blown foam.

Blowing agents which are solids or liquids which decompose to produce gaseous byproducts at elevated temperatures can in theory be useful, but have not achieved commercial success. Air, nitrogen, argon, and carbon dioxide under pressure can also be used in theory, but have not proven commercially viable. Variable pressure foam (VPF), manufactured with the mold or conveyor maintained under low pressure (vacuum) has also met with some success. Research in such areas continues, particularly in view of the trend away from chlorofluorocarbons.

Polyurethane foams generally require a surfactant to promote uniform cell sizes and prevent foam collapse. Such surfactants are well known to those skilled in the art, and are generally polysiloxanes or polyoxyalkylene polysiloxanes. Such surfactants are described, for example, in the POLYURETHANE HANDBOOK on pages 98–101. Commercial surfactants for these purposes are available from a number of sources, for example from Wacker Chemie, OSi Specialities, Inc., and Air Products and Chemicals, Inc.

Processes for the preparation of polyurethane foams and the equipment used therefore are well known to those in the art, and are described, for example, in the POLYURETHANE HANDBOOK in Chapter 4, pages 117–160 and in POLYURETHANES: CHEMISTRY AND TECHNOLOGY, Part II, Technology, in Chapter VIII, §§III and IV on pages 7–116 and Chapter VIII, §§III and IV on pages 201–238.

Flame retardant polyurethane foams may be prepared as taught by U.S. Pat. Nos. 4,745,133, 4,826,884, and 4,849,459, containing an effective amount of melamine, and optionally a second flame retardant, preferably a halogenated phosphate ester flame retardant. Amounts of melamine which may be effective range from 5 to about 55 weight percent based on the weight of the foam, preferably 10 to about 40 weight percent, and more preferably from 15 to about 35 percent. Such foams show surprisingly increased flame resistance as compared to otherwise similar foams. Such foams are capable of passing, inter alia, the California 117, 133, and the United Kingdom "Crib 5" flammability tests, with the latter two tests requiring higher levels of melamine than the former.

In the process of the subject invention, it is important that both the polyether polyol and polymer polyol have nominal functionalities of about 6 or more. Nominal functionalities of 6 to 8 are preferable, for example. It would not depart from the spirit of the invention to include in the polyether polyol or polymer polyol, polyols which have nominal functionalities of 4 or more, provided that the overall calculated nominal functionality of the polyol mixture is at least 5.5. Minor amounts of other polyols, for example polyester polyols or amino-functional polyols may be used as well when the proviso with regard to overall functionality is met. Thus, by way of example, for the polyether polyol component, up to about 25 to 30 mol percent may have a functionality of four while the remainder has a functionality of six.

Both the polyether polyol and the polymer polyol base polyol are capped with ethylene oxide, resulting in polyols with high primary hydroxyl content. The weight percentage of ethylene oxide-derived oxyethylene moieties in the cap must be at least about 12%, and preferably about 15% at a minimum, and may range up to 30 weight percent, preferably 25 weight percent. As oxyethylene content is generally thought to increase water adsorption in polyurethane polymers, it is highly surprising that the polyol components of the subject invention produce foams with improved wet set values, even more surprising with respect to the teaching of U.S. Pat. No. 4,111,865 relative to the deleterious effects of increased oxyethylene cap content on humid aging properties.

The high functionality polyols may be prepared by traditional base-catalyzed polymerization of alkylene oxides onto a suitable initiator, i.e. an initiator containing six or more hydrogen atoms capable of being oxyalkylated. It is preferred that the principal alkylene oxide be propylene oxide, although other alkylene oxides, particularly those with from two to four carbon atoms are also suitable. Such alkylene oxides include ethylene oxide and 1,2- and 2,3-butylene oxide, for example. Preferably, propylene oxide alone is initially used, or mixtures of propylene oxide with ethylene oxide and/or butylene oxide(s) to form a polyoxypropylene homopolymer or random polyoxypropylene copolymer. Following preparation of a polyoxypropylene homopolymer or copolymer of sufficient molecular weight, the polymerization may be allowed to proceed to the point where there is substantially no unreacted propylene oxide or other higher alkylene oxides, following which ethylene oxide is added in sufficient amount so as to provide a 12% to 30%, preferably 15% to 25% by weight oxyethylene cap, these weight percentages based on the weight of the finished, oxyethylene capped polyol. By this process, a polyether polyol having a high primary hydroxyl content may be prepared. The hydroxyl number of the polyols used in the subject invention are preferably less than 50, more preferably in the range of 25–35.

The polymer polyol may be prepared by polymerizing an unsaturated monomer, as previously indicated, in a base polyol with a nominal functionality of about 6 or more, preferably 6–8, and an oxyethylene content, as a cap, of from 12 to about 30 weight percent, preferably 15 to 25 weight percent. The base polyol may be the same or different from the conventional polyether polyol, and the unsaturated monomers are preferably acrylonitrile and styrene, although other unsaturated monomers may be used as well. The solids content of the polymer polyol is not critical, and may range from less than 5% by weight to about 60% by weight or more. Preferably, the solids content is in the range of 10% to 50%, more preferably 15% to 45%, and most preferably 25–40%. The solids content required is dictated by the load bearing requirements of the foam. The amount of polymer polyol is adjusted to supply total polymer solids in the foam forming polyol component of from 1 to about 60 weight percent, preferably 5 to about 25%, and more preferably 10 to about 20% by weight, based on the weight of the polyol components.

The polyurethane foams of the subject invention are amine catalyzed foams. Preferably, conventional amine catalysts such as Niax® A1, bis(2-dimethylaminoethyl)ether, and Niax® A-33, triethylenediamine, are used. Other amine catalysts are suitable as well. These amine catalysts are used in amounts preferably of from 0.001 to about 5, preferably 0.05 to 1, and more preferably 0.1 to about 0.5 weight percent each, based on the weight of polyol component (polyether polyol plus polymer polyol), and may advantageously be dissolved in a suitable solvent, for example a polyol or glycol, e.g., dipropylene glycol. Tin catalysts should be avoided. However, it would not depart from the spirit of the invention to add a most minor amount of the catalyst, for example, 0.001 to about 0.01 percent by weight based on the weight of polyol, as tin catalysts in these amounts will not adversely affect the wet set properties of the foam product. Such polyurethane systems may still be considered amine catalyzed, as that term is used herein. Most preferably, the polyurethane reactive components are devoid of tin catalysts.

The isocyanates useful in the subject invention may be selected from known isocyanates. However, preferred isocyanates are toluene diisocyanate (TDI), methylenediphenylene diisocyanate (MDI), polymeric methylenediphenylene diisocyanate (PMDI), and the various modified isocyanates prepared by reacting one of the aforementioned isocyanates with minor amounts of aliphatic glycols, low molecular weight polyoxyalkylene glycols or triols, and the like, as well as the well known carbodiimide modified, urea modified, allophanate modified, and uretonimine modified isocyanates. Preferably, TDI or mixtures of TDI and MDI are utilized. The isocyanate is supplied to the formulation in an amount such that the isocyanate index ranges from 70 to 130, preferably from 90 to 110, more preferably from 95 to 105, and most preferably from 100–105.

The formulations of the present invention preferably contain a crosslinker and/or chain extender. Suitable chain extenders are difunctional, low molecular weight, isocyanate reactive compounds, for example aliphatic diols and polyoxyalkylene diols with molecular weights below 300, preferably below 200; diamines and polyalkylene polyamines such as ethylene diamine, toluene diamine, the various alkyl-substituted hindered toluene diamines and methylenediphenylene diamines, and the monohydroxyl-functional amines such as monoethanolamine and 4-aminophenol. Preferably, however, crosslinkers are used. Examples of suitable crosslinkers include tri- to octafunctional aliphatic polyhydroxy compounds and their low molecular weight oxyalkylated analogs, for example glycerine, triethanolamine (TEOA), trimethylolpropane, pentaerythritol, O,O',O"-tris[2-hydroxyethyl and 2-hydroxypropyl]glyceryl or trimethylolpropyl ethers; low molecular weight oxyalkylated hydroxyamines or diamines, for example N,N,N',N'-tetrakis[2-hydroxyethyl or 2-hydroxypropyl]ethylene diamine; and alkanolamines such as diethanolamine. Particularly preferred is diethanolamine (DEOA).

The amount of crosslinker may be adjusted from 0 to 5 weight percent based on the weight of the polyol components, preferably from 1 to 4 weight percent, and most preferably 1 to 2 weight percent. Most preferably, the crosslinker is DEOA in the range of 1.0 to 1.7 weight percent, more preferably 1.3 to about 1.5 weight percent. Greater amounts of crosslinker may undesirably decrease processing latitude. Surprisingly, even small amounts of crosslinker such as DEOA dramatically increase wet set in hot molded foams, whether used with conventional hot molding polyols or more reactive polyols. In the foams of the subject invention, however, crosslinkers can be utilized and result in low wet set values even without a post cure of the foam.

The foams of the present invention may be manufactured to a wide range of hardnesses and densities. Densities are in the range of 1.2 to about 4 lbs/ft$^3$, preferably 1.7 to about 3.5 lbs/ft$^3$, more preferably 1.7 to about 2.5 lbs/ft$^3$, and most preferably about 2 lbs/ft$^3$, for example 1.9 to about 2.2 lbs/ft$^3$. The hardnesses may be adjusted by methods well known to the art, for example by increasing the solids or crosslinker to levels required for the particular application. Surprisingly, by the preferred cold molding process without post cure, foams may be prepared at softness levels obtainable from hot molding only with the addition of monol. Addition of monol to hot process foam is known to severely and adversely affect numerous properties including tear strength and tensile strength, and is particularly detrimental with respect to wet set properties.

A surfactant is necessary for the production of acceptable foam. Suitable surfactants are well known to the art. A preferred surfactant is B8708 available from Goldschmidt, A. G. Another preferred surfactant is DC 5043 available from Air Products and Chemicals, Inc. The surfactant should be present in an amount of from 0.001 to about 5 weight percent based on the weight of the polyol components, preferably from 0.5 to about 2 weight percent, and most preferably 1 to 2 weight percent.

COMPARATIVE EXAMPLES 1–5

Effect Of Crosslinker On Wet Set Of Hot Molded Foams

A series of hot molded foams were prepared with and without DEOA crosslinker. The polyols utilized were a conventional, hot molding polyol and a more reactive polyol. Foams were prepared at two different densities using a combination of amine and tin catalysts. The mold was preheated to 65° C. and cured by placing in an oven maintained at 180° C. for 12 minutes. The formulations and physical properties are presented in Table I.

TABLE I

| COMPOSITION | 1 | 2 | 3 | 4 | 5 |
|---|---|---|---|---|---|
| Polyol A[1] | 100 | 100 | — | — | — |
| Polyol B[1] | — | — | 100 | 100 | 100 |
| Water | 3.6 | 3.6 | 3.6 | 3.6 | 3.6 |
| DEOA | — | 0.4 | 1.2 | — | 0.4 |
| A-33 | 0.3 | 0.3 | 0.3 | 0.3 | 0.3 |
| B2370 | 0.7 | 0.7 | 0.7 | 0.7 | 0.7 |
| Stannous Octoate | 0.06 | 0.06 | 0.06 | 0.06 | 0.06 |
| TDI | 45.9 | 47 | 45.9 | 43.8 | 43.8 |
| Index | 1.05 | 105 | 105 | 107 | 105 |
| PROPERTIES | | | | | |
| Density, kg/m$^3$ | 30.7 | 30.1 | 28.7 | 32.8 | 32.6 |
| Renault, wet set % | 6.0 | 14.1 | 19.4 | 9.2 | 19.7 |

[1]A hot molding polyol which is a glycerine initiated polyoxyalkylene polyol containing 11 weight percent oxyethylene moieties with 6% present as a cap. The hydroxyl number is 56, and the polyol contains a conventional BHT-based stabilizer package.

TABLE I-continued

| COMPOSITION | 1 | 2 | 3 | 4 | 5 |
|---|---|---|---|---|---|

[2] A polyol composition containing 50 weight percent of a glycerine initiated polyoxypropylene polyol containing 14 weight percent oxyethylene moieties as a cap and having a hydroxyl number of 35, and 50 weight percent of a glycerine initiated polyoxypropylene polyol containing 19 weight percent oxyethylene moieties as a cap and a hydroxyl number of 35.7

Comparative examples 1–5 show that hot molded foam may be formulated to meet wet set requirements (i.e., <20% set). However, the addition of even small amounts of DEOA crosslinker dramatically increases wet set, regardless of whether conventional hot molding polyols (c.f. Comparative Examples 1 and 2) or more reactive polyols (c.f. Comparative Examples 3, 4 and 5) are used. Hot molding reduces throughput and exposes workers to hot tool surfaces, as well as requiring large, expensive ovens.

COMPARATIVE EXAMPLES 6–9

Effect Of Softening Hot Molded Foam By Monol Addition On Wet Set

Hot molded foams were prepared as in Comparative Examples 1–5, but with addition of monol to soften the foam. Formulations and physical properties are indicated in Table II.

TABLE II

| COMPOSITION | 6 | 7 | 8 | 9 |
|---|---|---|---|---|
| Polyol C[3] | 100 | 75 | 100 | 75 |
| Monol | — | 25 | — | 25 |
| Water | 3.5 | 3.5 | 4.0 | 4.0 |
| A-33 | 0.3 | 0.3 | 0.3 | 0.3 |
| B2370 | 0.7 | 1.0 | 0.8 | 0.8 |
| Stannous Octoate | 0.06 | 0.20 | 0.08 | 0.16 |
| TDI Index | 100 | 100 | 100 | 100 |
| PROPERTIES | | | | |
| Density, kg/m$^3$ | 41 | 38.6 | 34.4 | 33.3 |
| CLD 50%, kPa | 4.96 | 3.16 | 5.21 | 3.64 |
| Dynamic Fatigue | | | | |
| Height loss, % | 2.1 | 2.6 | 2.3 | 4.3 |
| CLD loss, % | 22.0 | 26.0 | 18.5 | 29.6 |
| 75% Comp. Set, % | 5.6 | 8.1 | 5.1 | 10.3 |
| Renault wet set % | 8.0 | 26.2 | 7.2 | 22.5 |
| Tensile Strength, kPa | 101 | 70 | 120 | 84 |
| Elongation, % | 172 | 210 | 153 | 181 |
| Tear Strength, N/m | 375 | 296 | 297 | 264 |

[3] Polyol C is a hot molding polyol similar to polyol A but with reduced stabilizer content.

The results shown in Table II indicate that while monol softens the foams considerably (note the CLD values), it does so at the expense of tensile strength and tear strength. Further, the compression sets are worse, and most notably, there is a three to fourfold increase in wet set.

COMPARATIVE EXAMPLES 10–11

Effect Of Post Cure And Crosslinker On Wet Set

Two foam formulations employing different amounts of DEOA crosslinker were cold molded employing a conventional hot molding low solids polyol mixture, but amine catalyzed. The formulations and physical properties reported in Table III.

TABLE III

| COMPOSITION | 10 | 12 |
|---|---|---|
| Polyol D[4] | 100 | 100 |
| Water | 4.0–4.4 | 4.0–4.4 |
| Crosslinker | 1.2 | 4.2 |
| Amine catalyst | 0.21 | 0.21 |
| Surfactant | 0.8 | 0.8 |
| TDI Index | 90–105 | 90–105 |
| PROPERTIES | | |
| Overall density, kg/m$^3$ | 32–34 | 32–37 |
| Core density, kg/m$^3$ | 28–33 | 29–32 |
| CLD 50%, kPa | 2.2–3.7 | 2.4–3.9 |
| Dynamic Fatigue | | |
| Height loss, % | 1.3–3.7 | 0.5–2.9 |
| CLD loss, % | 11.2–17.9 | 4.0–10.2 |
| 75% Comp. Set, % | 5.8–14.8 | 3.8–5.9 |
| Renault Wet Set, % | | |
| After 3 days | 32.0–62.9 | 24.9 |
| After 2 weeks | 26.1–29.5 | 21.2–24.6 |
| After Post Cure (30 mins. @ 120° C.) | 20.1–25.5 | 15.3–20.2 |
| Wet Set without skin, % | 19–23 | 13.5–16.2 |
| Elongation, % | 93–115 | 60–87 |
| Tear Strength, N/m | 102–150 | 82–122 |
| Tensile Strength, kPa | 71–161 | 51–83 |

[4] Polyol D is a blend of a sorbitol initiated polyoxypropylene polyol containing 16 weight percent oxyethylene moieties as a cap, having a hydroxyl number of 28, and ARCOL ® E788, a glycerine initiated polyoxypropylene, 39 weight percent vinyl solids polymer polyol available from the ARCO Chemical Company, having a hydroxyl number of 22.

Table III indicates that when attempts are made to use conventional hot molding polyols to prepare cold molded foam, addition of large amounts of DEOA crosslinker produces a cold molded foam which exhibits low wet set values, but only after post curing at 120° C. for 30 minutes. However, the extensively crosslinked foam is harder than that produced from low levels of crosslinker, and further exhibits considerably reduced tensile strength, tear strength, and elongation. The processing window is also narrowed by the large amount of crosslinker. Post curing is undesirable as it is time intensive and requires large ovens for commercial throughput.

EXAMPLES 12–17 AND COMPARATIVE EXAMPLES 18–29

Effect Of Base Polyol And Polymer Polyol Functionality On Wet Set

A series of foams were prepared from polyether polyols and polymer polyols wherein the functionality of the two polyols are varied. The foam densities are altered by adjusting water content. The remaining ingredients of the formulation are as follows, where "pphp" is parts per hundred based on the weight of the polyol components:

| | |
|---|---|
| DEOA | 1.4 pphp |
| Niax ® A1 | 0.1 pphp |
| Niax ® A-33 | 0.3 pphp |
| DC 5043 surfactant | 1.5 pphp |
| TDI (80/20) | 100 index. |

The remainder of the formulations and physical properties are presented in Table IV.

TABLE IV

| EXAMPLE | Polyether Polyol Func.[5] | Polymer Polyol Func.[6] | Ave. Func. | % Solids | $H_2O$ (pphp) | Density (lb/ft³) | 50% IFD | Resilience | Wet Set[7] | % Improvement |
|---|---|---|---|---|---|---|---|---|---|---|
| 18 (Comparative) | 3 | 3 | 3 | 20 | 4.5 | 1.9 | 91 | 64 | 28.8 | — |
| 19 (Comparative) | 6 | 3 | 4.78 | 20 | 4.5 | 1.9 | 86 | 67 | 26.4 | 8.3 |
| 20 (Invention) | 6 | 6 | 6 | 20 | 4.5 | 1.9 | 83 | 70 | 15.5 | 46.2 |
| 21 (Comparative) | 3 | 3 | 3 | 20 | 3.5 | 2.3 | 87 | 65 | 23 | — |
| 22 (Comparative) | 6 | 3 | 4.78 | 20 | 3.5 | 2.2 | 85 | 68 | 21.4 | −7.0 |
| 23 (Invention) | 6 | 6 | 6 | 20 | 3.5 | 2.2 | 80 | 70 | 11.3 | 50.9 |
| 24 (Comparative) | 3 | 3 | 3 | 20 | 2.5 | 3.4 | 131 | 67 | 13.2 | — |
| 25 (Comparative) | 6 | 3 | 4.78 | 20 | 2.5 | 3.3 | 131 | 72 | 13.4 | −1.5 |
| 26 (Invention) | 6 | 6 | 6 | 20 | 2.5 | 3.3 | 134 | 72 | 8.5 | 35.6 |
| 27 (Comparative) | 3 | 3 | 3 | 10 | 4.5 | 1.9 | 64 | 66 | 26.3 | — |
| 28 (Comparative) | 6 | 3 | 5.46 | 10 | 4.5 | 1.9 | 60 | 72 | 18.7 | 28.9 |
| 29 (Invention) | 6 | 6 | 6 | 10 | 4.5 | 1.9 | 57 | 74 | 13.9 | 47.1 |
| 30 (Comparative) | 3 | 3 | 3 | 10 | 3.5 | 2.3 | 61 | 68 | 17.9 | — |
| 31 (Comparative) | 6 | 3 | 5.46 | 10 | 3.5 | 2.2 | 57 | 74 | 16.8 | 6.1 |
| 32 (Invention) | 6 | 6 | 6 | 10 | 3.5 | 2.2 | 57 | 74 | 12.4 | 30.7 |
| 33 (Comparative) | 3 | 3 | 3 | 10 | 2.5 | 3.4 | 92 | 72 | 11.3 | — |
| 34 (Comparative) | 6 | 3 | 5.46 | 10 | 2.5 | 3.3 | 90 | 75 | 11.1 | 1.8 |
| 35 (Invention) | 6 | 6 | 6 | 10 | 2.5 | 3.3 | 89 | 75 | 7.2 | 36.3 |

[5]The polyether polyols of functionality 3 are glycerine initiated polyoxypropylene polyols capped with 19% ethylene oxide, hydroxyl number of 35; whereas the 6-functional polyols are sorbitol initiated polyoxypropylene polyols capped with 16% ethylene oxide, hydroxyl number 28. Both polyols are potassium hydroxide catalyzed and refined to remove residual catalysts.
[6]The polymer polyol of functionality 3 is a glycerine initiated polyoxypropylene polyol, hydroxyl number 22, containing 38% acrylonitrile/styrene polymer solids and available commercially as Hyperlite 1610 from ARCO Chemical Co. The 6-functional polymer polyol contains 25% by weight acrylonitrile/styrene polymer solids and a hydroxyl number of 21, the base polyol of which is the 6-functional polyether polyol referred to above.
[3]Japanese Wet Set Table IV indicates that at the same solids and density, substituting a polyol having a functionality of 6 (either conventional or polymer polyol) for the corresponding polyol having a functionality of 3 results in general in a slight improvement in wet set properties, although in some cases, the wet set actually increases. However, by utilizing a 6 functional polyol as both the conventional polyol and polymer polyol, a uniform large decrease in wet set is achieved. The large decrease is not gradual or predictable due to an increase in overall functionality, but occurs as an unexpected step function.

Figure 2:
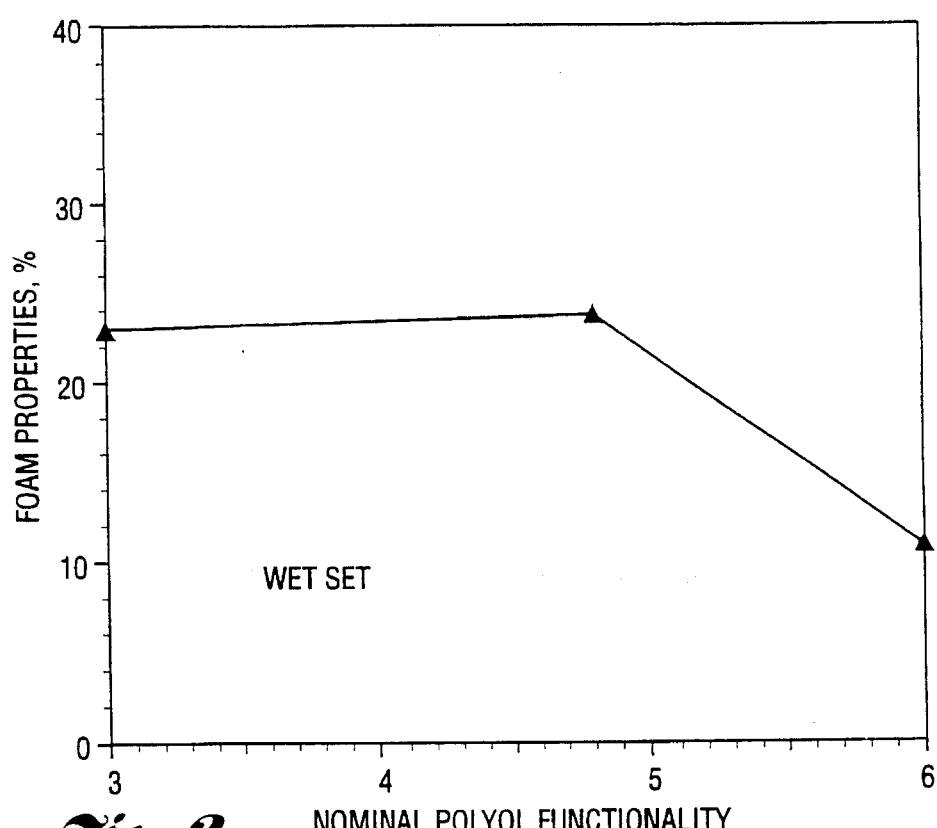
FIG. 2 is a plot of wet set versus functionality for cold molded, amine catalyzed polyurethane foams.

For example, as illustrated in FIG. 1, the resiliency of a cold molded foam shows a gradual and almost linear increase as the overall polyol functionality increases from 3 to 6. However, as shown in FIG. 2, Japanese wet set improves dramatically after an overall functionality of 4.8 has been reached. These changes are unexpected and certainly do not correlate with other foam properties such as the resiliency illustrated by FIG. 1.

While the best mode for carrying out the invention has been described in detail, those familiar with the art to which this invention relates will recognize various alternative designs and embodiments for practicing the invention as defined by the following claims.

What is claimed is:

1. A polyol composition suitable for the preparation of amine catalyzed, high resilience polyurethane foam exhibiting improved wet set values, comprising:

a)i) a polyoxyalkylene polyether polyol comprising minimally 70 mol percent of a polyoxyalkylene polyol component containing in major part $C_{3-4}$ oxyalkylene moieties, having from 12% to about 30% by weight oxyethylene moieties as a cap, and having a nominal functionality of 6 or greater; and a)ii) a polymer polyol containing a vinyl polymer dispersion in a base polyoxyalkylene polyol component comprising minimally 70 mol percent of a polyoxyalkylene polyol containing in major part $C_{3-4}$ oxyalkylene moieties, having from 12% to about 30% by weight oxyethylene moieties as a cap, and a nominal functionality of 6 or greater;

wherein said percents oxyethylene moieties are percents by weight based on the total respective polyoxyalkylene polyol component weight, and wherein the average nominal functionality of a)i and a)ii in combination is about 5.5 or greater, and wherein said polyoxyalkylene polyols have hydroxyl numbers of 50 or less.

2. The polyol composition of claim 1 wherein said oxyethylene moieties present as a cap constitute from 15% to about 25% by weight of said polyoxyalkylene polyols.

3. The polyol composition of claim 1 wherein the hydroxyl number of said polyol composition is between 25 and 35.

4. The polyol composition of claim 1 wherein said a)i) polyoxyalkylene polyol component and said a)ii) polyoxyalkylene polyol component comprise minimally 90 mol percent of said polyether polyol a)i) and said polymer polyol a)ii).

5. The polyol composition of claim 1 wherein said average nominal functionality is 6 or greater.

6. The polyol composition of claim 1 further comprising from 0.5% to 5.0% by weight of a chain extender and/or crosslinker relative to the weight of said polyether polyols a)i) and a)ii).

7. The polyol composition of claim 1 further comprising from 0.001 to about 5 weight percent of one or more amine catalysts effective to promote formation of urethane linkages when said polyol composition is reacted with a di- or polyisocyanate or mixture thereof.

8. The polyol composition of claim 6 further comprising from 0.001 to about 5 weight percent of one or more amine catalysts effective to promote formation of urethane linkages when said polyol composition is reacted with a di- or polyisocyanate or mixture thereof.

9. The polyol composition of claim 1 further comprising 0.001 to about 5 weight percent of a cell maintaining surfactant relative to the weight of said polyether polyol a)i) and a)ii).

10. The polyol composition of claim 8 further comprising 0.001 to about 5 weight percent of a cell maintaining surfactant relative to the weight of said polyether polyol a)i) and a)ii).

* * * * *